(12) United States Patent
Takinai et al.

(10) Patent No.: US 11,180,157 B2
(45) Date of Patent: Nov. 23, 2021

(54) MONITORING APPARATUS AND DRIVING FORCE CONTROL SYSTEM

(71) Applicant: DENSO CORPORATION, Kariya (JP)

(72) Inventors: Shingo Takinai, Kariya (JP); Yutaka Koyama, Kariya (JP); Yu Kimoto, Kariya (JP); Kotaro Yasui, Kariya (JP)

(73) Assignee: DENSO CORPORATION, Kariya (JP)

( * ) Notice: Subject to any disclaimer, the term of this patent is extended or adjusted under 35 U.S.C. 154(b) by 85 days.

(21) Appl. No.: 16/781,738

(22) Filed: Feb. 4, 2020

(65) Prior Publication Data

US 2020/0262443 A1 Aug. 20, 2020

(30) Foreign Application Priority Data

Feb. 20, 2019 (JP) .............................. JP2019-028621

(51) Int. Cl.
*B60W 50/04* (2006.01)
*B60W 50/029* (2012.01)
*B60R 16/023* (2006.01)
*B60W 10/04* (2006.01)

(52) U.S. Cl.
CPC ....... *B60W 50/045* (2013.01); *B60R 16/0231* (2013.01); *B60W 10/04* (2013.01); *B60W 50/029* (2013.01); *B60W 2050/0292* (2013.01)

(58) Field of Classification Search
CPC .. B60W 50/045; B60W 50/029; B60W 10/04; B60W 2050/0292; B60W 2530/10; B60W 2530/20; B60W 2050/021; B60W 50/0205; B60W 2720/30; B60R 16/0231; B60C 23/00; B60K 31/00
See application file for complete search history.

(56) References Cited

U.S. PATENT DOCUMENTS

| 6,230,094 | B1 | 5/2001 | Ohashi et al. |
| 2004/0254766 | A1 | 12/2004 | Ito |
| 2015/0120168 | A1 | 4/2015 | Kono |
| 2018/0181124 | A1 | 6/2018 | Fukuda et al. |
| 2019/0039595 | A1* | 2/2019 | Hawley ................. B60W 20/30 |

FOREIGN PATENT DOCUMENTS

CN 106926842 A * 7/2017

* cited by examiner

*Primary Examiner* — Marthe Y Marc-Coleman
(74) *Attorney, Agent, or Firm* — Posz Law Group, PLC

(57) ABSTRACT

A monitoring apparatus used in a vehicle is provided to communicate with an electronic control apparatus that controls a driving force of the vehicle by executing any one of a plurality of predetermined different controls. The monitoring apparatus receives a vehicle specification from the electronic control apparatus, and determines whether the received vehicle specification is appropriate, to provide a determination result. The monitoring apparatus further sets whether at least one of the predetermined different controls is permitted or not permitted to be executed by the electronic control apparatus in response to the determination result.

19 Claims, 7 Drawing Sheets

MONITORING APPARATUS AND DRIVING FORCE CONTROL SYSTEM

CROSS REFERENCE RELATED APPLICATION

The present application claims the benefit of priority from Japanese Patent Application No. 2019-28621 filed on Feb. 20, 2019. The entire disclosure of the above application is incorporated herein by reference.

TECHNICAL FIELD

The present disclosure relates to a technique for controlling driving force of a vehicle.

BACKGROUND

A system is known in which a plurality of electronic control units communicate with each other. For example, a technique is proposed which transmits and receives data necessary for execution of processing by the electronic control units during operation of the system.

There is a driving force monitoring system that includes a plurality of electronic control units to control the driving force of a vehicle. Also, in such a driving force monitoring system, necessary data are transmitted and received by the respective electronic control units to execute processing while securing a safety of an occupant.

SUMMARY

According to an example of the present disclosure, a monitoring apparatus used in a vehicle is provided to communicate with an electronic control apparatus that controls a driving force of the vehicle by executing any one of a plurality of predetermined different controls. The monitoring apparatus receives a vehicle specification from the electronic control apparatus, and determines whether the received vehicle specification is appropriate, to provide a determination result. The monitoring apparatus further sets whether at least one of the predetermined different controls is permitted or not permitted to be executed by the electronic control apparatus in response to the determination result.

BRIEF DESCRIPTION OF DRAWINGS

The objects, features and advantages of the present disclosure will become more apparent from the following detailed description made with reference to the accompanying drawings. In the drawings.

DETAILED DESCRIPTION

The following describes embodiments of the present disclosure with reference to the drawings.

1. First Embodiment

1-1. Configuration

Figure 1:
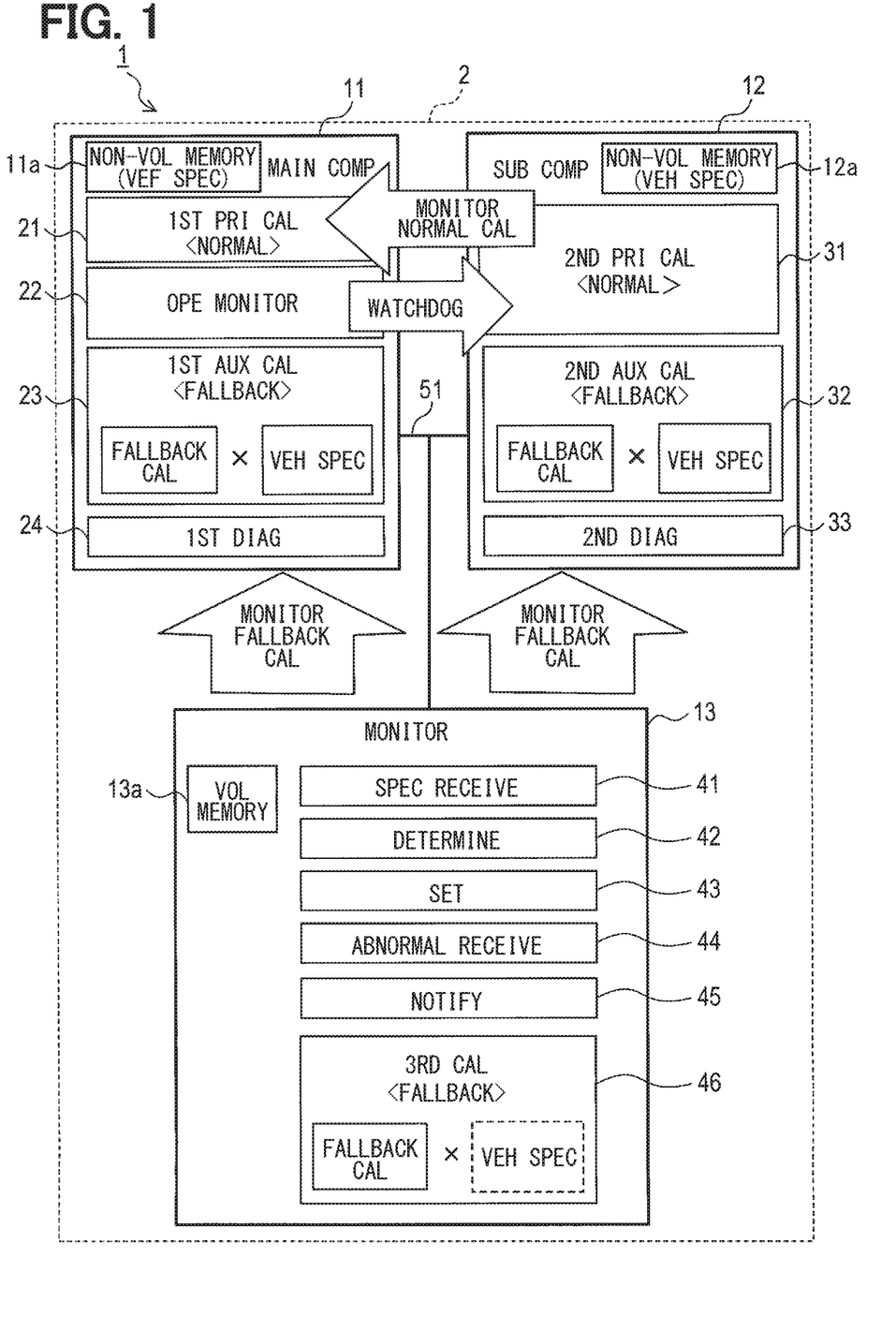
FIG. 1 is a block diagram illustrating a configuration of a driving force control system according to a first embodiment.

A driving force control system 1 shown in FIG. 1 includes a main microcomputer 11, a sub microcomputer 12, and a monitoring apparatus 13. These apparatuses or the like are connected with each other via a communication link 51 and are housed in one housing 2. The driving force control system 1; which is mounted in a vehicle (i.e., a host vehicle), provides a function of controlling the driving force of the vehicle, calculates the driving force based on the accelerator opening, the shift range; the vehicle speed, and the like, and outputs a control signal to a driving source. Here, the driving source corresponds to an engine, a motor, or the like that generates a driving force for driving the vehicle.

The main microcomputer 11 corresponds to a first electronic control unit, and the sub microcomputer 12 corresponds to a second electronic control unit. Further, an electronic control apparatus may be defined to include the main microcomputer 11 and the sub microcomputer 12.

The main microcomputer 11 is a microcomputer having a CPU and a semiconductor memory such as a RAM or a ROM. Each function of the main microcomputer 11 is realized by the CPU executing a program stored in a non-transitory tangible storage medium. In this example, the memory corresponds to the non-transitory tangible storage medium storing the program. The sub microcomputer 12 is a microcomputer having the same configuration as that of the main microcomputer 11. The non-volatile memory 11a included in the main microcomputer 11 and the non-volatile memory 12a included in the sub microcomputer 12 each store vehicle specifications (i.e., a vehicle specification group) of the vehicle on which the driving force control system 1 is mounted. Here, the vehicle specifications correspond to parameters that vary depending on the vehicle type; the parameters including vehicle weight, tire diameter, and differential ratio.

The main microcomputer 11 includes a first primary calculation module 21, an operation monitoring module 22, a first auxiliary calculation module 23, and a first diagnosis module 24. The first primary calculation module 21 is configured to calculate a normal driving force. The normal driving force is a driving force obtained by a predetermined calculation when no abnormality is detected in the driving force control system 1. The normal driving force is optimized according to the vehicle type and grade of the vehicle. In the present embodiment, the first primary calculation module 21 first performs a driving force calculation that does not depend on the vehicle specifications, and then performs a correction considering the vehicle specifications. The former driving force calculation is a first calculation for determining the target vehicle speed from the accelerator opening. The latter correction is a second calculation for converting the target vehicle speed into a driving force based on vehicle specifications. The vehicle specifications used for the second calculation are stored in the nonvolatile memory 11a of the main microcomputer 11.

The operation monitoring module 22 performs monitoring of the normal operation of the sub microcomputer 12 by so-called watchdog monitoring that checks a signal periodically transmitted from the sub microcomputer 12.

The first auxiliary calculation module 23 is configured to calculate the driving force for fallback travel (the fallback travel driving force). The fallback travel driving force is a driving force obtained by a simplified calculation method compared with a calculation for calculating a normal driving force. The fallback travel driving force has fewer conditions to be considered in the calculation than the normal driving force. As a result, for example, the driving force is limited in function compared to the normal driving force, and there is no characteristic of the driving force for each vehicle type. In the present embodiment, the first auxiliary calculation module 23 first performs a driving force calculation that does not depend on the vehicle specifications, as in the first primary calculation module 21, and then performs a correction in consideration of the vehicle specifications.

The main microcomputer 11 outputs a control signal to the drive source so as to realize the normal driving force determined by the first primary calculation module 21 or the fallback driving force determined by the first auxiliary calculation module 23. Hereinafter, the driving force control using the normal driving force is also referred to as a normal control. Further, the driving force control using the fallback travel driving force is hereinafter also referred to as a fallback control.

The first diagnosis module 24 diagnoses an abnormality in the main microcomputer 11. Here, ROM/RAM check, internal circuit abnormality diagnosis, and the like in the main microcomputer 11 are executed by known methods. The first diagnosis module 24 notifies the monitoring apparatus 13 of the presence or absence of an abnormality obtained by the diagnosis.

The sub microcomputer 12 includes a second primary calculation module 31, a second auxiliary calculation module 32, and a second diagnosis module 33. The second primary calculation module 31 is configured to calculate a normal driving force. The normal driving force here is the same as the normal driving force calculated by the first primary calculation module 21. The vehicle specifications used for the calculation are stored in the nonvolatile memory 12a of the sub microcomputer 12. Further, the second primary calculation module 31 compares the normal driving force obtained by the second primary calculation module 31 with the normal driving force obtained by the first primary calculation module 21. Thus, it is monitored that the main microcomputer 11 is operating normally. In the present embodiment, the normal driving force obtained by the second primary calculation module 31 is only used for the above-described comparison, and is not used for controlling the driving source.

The second auxiliary calculation module 32 is configured to calculate the fallback travel driving force. The fallback travel drive force here is the same as the fallback travel drive force calculated by the first auxiliary calculation module 23. Unlike the normal driving force obtained by the second primary calculation module 31, the fallback travel driving force obtained here may be used for controlling the drive source.

The second diagnosis module 33 diagnoses an abnormality in the sub microcomputer 12. Here, ROM/RAM check, internal circuit abnormality diagnosis, and the like in the sub microcomputer 12 are executed by known methods. The second diagnosis module 33 notifies the monitoring apparatus 13 of the presence or absence of an abnormality obtained by the diagnosis.

As an example, in the present embodiment, the monitoring apparatus 13 is provided as a so-called ASIC (Application Specific Integrated Circuit), which is an integrated circuit for realizing a plurality of functions described below. The monitoring apparatus 13 includes a memory 13a that is a volatile memory. The memory 13a includes at least a storage area for storing vehicle specifications and a storage area for managing various flags.

The monitoring apparatus 13 may be configured as one or more controllers (i.e., control circuits, or processors) by including a plurality of modules, which may be also referred to as steps, sections, or units, to achieve the respective functions. The modules include a specification reception module 41, a determination module 42, a setting module 43, an abnormality reception module 44, a notification module 45, and a third calculation module 46.

The specification reception module 41 is configured to receive vehicle specifications from each of the main microcomputer 11 and the sub microcomputer 12, individually. The received vehicle specifications are stored in the memory 13a.

The determination module 42 is configured to determine whether or not the vehicle specifications received by the specification reception module 41 are appropriate. The determination module 42 determines that the vehicle specifications received from the main microcomputer 11 and the vehicle specifications received from the sub microcomputer 12 match, and determines that they are not appropriate when they do not match.

According to the determination result by the determination module 42, the setting module 43 sets whether a subject control is permitted to be executed by the main microcomputer 11 and whether the subject control is permitted to be executed by the sub microcomputer 12. The subject control corresponds to at least one (one in this embodiment) control among a plurality (two in this embodiment) of predetermined different controls. In the present embodiment, each of the main microcomputer 11 and the sub microcomputer 12 can execute the above-described normal control and the fallback control.

The abnormality reception module 44 receives the above-described abnormality diagnosis result from the main microcomputer 11 before the specification reception module 41 receives the vehicle specifications from the main microcomputer 11. The abnormality reception module 44 receives the above-described abnormality diagnosis result from the sub microcomputer 12 before the specification reception module 41 receives the vehicle specifications from the sub microcomputer 12.

The notification module 45 is configured to perform an output for notifying an occupant of the vehicle of an abnormality. The output destination is, for example, a control device (not shown) that controls a display and a speaker. The notification module 45 performs the above-described output to the control device when the determination module 42 determines that the vehicle specifications received by the specification reception module 41 are not appropriate. The control device receives the output and causes a display or a speaker to perform predetermined image display or audio output.

The third calculation module 46 is configured to calculate the fallback travel driving force. The fallback travel drive force here is the same as the fallback travel drive force calculated by the first auxiliary calculation module 23. The vehicle specifications used for the calculation are the vehicle specifications, which are acquired from the main microcomputer 11 or the sub microcomputer 12 after the monitoring apparatus 13 is activated and then stored in the memory 13a. The third calculation module 46 corresponds to a calculation module.

1-2. Processes

A control setting process executed by the monitoring apparatus 13 will be described with reference to the flowcharts of FIGS. 2 to 3. This process is started when there is a request to activate or start the vehicle. The request for activating the vehicle includes, for example, a manipulation of pressing a predetermined button for activating the vehicle, or a manipulation of turning on the ignition key by the user.

First, in S1, the monitoring apparatus 13 determines whether or not it has vehicle specifications at this time, that is, whether or not the vehicle specifications are stored in the memory 13a. For example, when the data in the memory 13a is not lost, such as if the period of time from when the power supply of the monitoring apparatus 13 is turned off to when it is turned on is extremely short, it is determined in S1 that the vehicle specifications are stored.

If the monitoring apparatus 13 determines that the vehicle specifications are stored in S1, the monitoring apparatus 13 proceeds to S13. On the other hand, if the monitoring apparatus 13 determines in S1 that the vehicle specifications are not stored, the monitoring apparatus 13 proceeds to S2 and prohibits the vehicle activation. Here, for example, a flag for permitting vehicle activation is turned off.

In S3, the monitoring apparatus 13 receives the abnormality diagnosis result of the main microcomputer 11 from the first diagnosis module 24. In S4, the monitoring apparatus 13 determines whether or not there is an abnormality in the main microcomputer 11. If the monitoring apparatus 13 determines that there is an abnormality in the main microcomputer 11 in S4, the control setting process is ended without permitting the vehicle activation.

On the other hand, if the monitoring apparatus 13 determines in S4 that there is no abnormality in the main microcomputer 11, the monitoring apparatus 13 proceeds to S5 and receives vehicle specifications from the main microcomputer 11. In S6, the monitoring apparatus 13 receives the abnormality diagnosis result of the sub microcomputer 12 from the second diagnosis module 33.

In S7, the monitoring apparatus 13 determines whether there is an abnormality in the sub microcomputer 12. If the monitoring apparatus 13 determines that there is an abnormality in the sub microcomputer 12 in S7, the monitoring apparatus 13 ends this control setting process without permitting vehicle activation.

On the other hand, if the monitoring apparatus 13 determines that there is no abnormality in the sub microcomputer 12 in S7, the monitoring apparatus 13 proceeds to S8 and receives vehicle specifications from the sub microcomputer 12. In S9, the monitoring apparatus 13 determines whether or not the vehicle specifications received in S5 matches the vehicle specifications received in S8.

If the monitoring apparatus 13 determines in S9 that the vehicle specifications received in S5 does not match the vehicle specifications received in S8, the monitoring apparatus 13 proceeds to S10 and disables the fallback travel. Here; for example; a flag for permitting fallback travel is turned off. In S11, the monitoring apparatus 13 outputs a signal to a control device that controls a display and/or a speaker (not shown) to provide a notification that notifies the occupant of the failure. Here, for example, the notification indicates that a normal operation is possible, but there is a failure part, so that the repair should be performed. Thereafter, the process proceeds to S14.

If the monitoring apparatus 13 determines that the vehicle specifications matches in S9, the monitoring apparatus 13 proceeds to S12 and stores the received vehicle specifications in the memory 13a of the monitoring apparatus 13. In S13, the monitoring apparatus 13 enables the fallback travel. Here, for example, a flag for permitting fallback travel is turned on.

In S14; the monitoring apparatus 13 permits vehicle activation. Here; for example, a flag for permitting vehicle activation is turned on and the vehicle is activated. Thereafter, the process proceeds to S21 in FIG. 3.

The processing after S21 is performed after the vehicle activation is permitted. In addition; D and E in FIG. 3 show the process sequence in the second embodiment mentioned later, and are not used in the first embodiment.

In S21, the monitoring apparatus 13 determines whether or not the occupant has performed a stop manipulation. Examples of the stop manipulation include a manipulation of pressing a button for stopping the operation of the vehicle and a manipulation of turning off an ignition key. If the monitoring apparatus 13 determines in S21 that the occupant has performed a stop manipulation, the control setting process is ended.

On the other hand, if the monitoring apparatus 13 determines in S21 that the occupant has not performed a stop manipulation, the monitoring apparatus 13 proceeds to S22 and determines whether or not an abnormality has occurred in the main microcomputer 11. The sub microcomputer 12 determines whether the error between the calculation result of the first primary calculation module 21 of the main microcomputer 11 and the calculation result of the second primary calculation module 31 of the sub microcomputer 12 is within an allowable range. If the error is not within the allowable range, the sub microcomputer 12 notifies the monitoring apparatus 13; the monitoring apparatus 13 thereby determines that an abnormality has occurred in the main microcomputer 11. The occurrence of abnormality in the main microcomputer 11 may be determined from the output signal of the first diagnosis module 24.

If the monitoring apparatus 13 determines in S22 that an abnormality has occurred in the main microcomputer 11, the monitoring apparatus 13 proceeds to S24. On the other hand, if the monitoring apparatus 13 determines in S22 that no abnormality has occurred in the main microcomputer 11, the monitoring apparatus 13 proceeds to S23.

In S23, the monitoring apparatus 13 determines whether or not an abnormality has occurred in the sub microcomputer 12. The main microcomputer 11 performs a watchdog monitoring to monitor the sub microcomputer 12. When there is an abnormality in the periodic signal from the sub microcomputer 12, the main microcomputer 11 notifies the monitoring apparatus 13; the monitoring apparatus 13 thereby determines that an abnormality has occurred in the sub microcomputer 12. The occurrence of abnormality in the sub microcomputer 12 may be determined from the output signal of the second diagnosis module 33.

If the monitoring apparatus 13 determines in S23 that an abnormality has occurred in the sub microcomputer 12, the monitoring apparatus 13 proceeds to S29. On the other hand, if the monitoring apparatus 13 determines in S23 that no abnormality has occurred in the sub microcomputer 12, the monitoring apparatus 13 proceeds to S21.

As described above, when the occupant does not perform a stop manipulation and neither the main microcomputer 11 nor the sub microcomputer 12 has an abnormality, S21 to S23 are repeated. That is, the monitoring apparatus 13 stands by until a stop manipulation is performed by the occupant or until an abnormality occurs in the main microcomputer 11 or the sub microcomputer 12. The monitoring apparatus 13 may be in a sleep state until it receives predetermined signals from the sensor for detecting the stop manipulation, from the main microcomputer 11, or from the sub microcomputer 12 to thereby exit from the loop of S21 to S23. When an abnormality occurs in the main microcomputer 11 or the sub microcomputer 12, a microcomputer in which no abnormality has occurred among the main microcomputer 11 and the sub microcomputer 12 performs fallback control when it is determined that the flag for fallback travel is on in S24 or S29 described later, for example.

S24 is executed when an abnormality has occurred in the main microcomputer 11. The monitoring apparatus 13 continuously checks whether the fallback control by the sub microcomputer 12 is normally performed by the processing of S24 to S28.

In S24, the monitoring apparatus 13 determines whether or not the fallback travel is enabled to be executed based on the flag set in S10 and S13, for example. If the monitoring apparatus 13 determines in S24 that the fallback travel is not enabled to be performed, the monitoring apparatus 13 proceeds to S34. On the other hand, if the monitoring apparatus 13 determines in S24 that the fallback travel is enabled to be executed, the monitoring apparatus 13 proceeds to S25.

In S25, the monitoring apparatus 13 simulates the driving force calculation for the fallback travel. Here, the fallback travel driving force is calculated using the vehicle specifications stored in S12. In S26, the monitoring apparatus 13 receives the driving force calculation result for the fallback travel from the sub microcomputer 12.

In S27, the monitoring apparatus 13 determines whether or not an error between the calculation result in S25 and the calculation result received in S26 is within an allowable range. If the error is within the allowable range, it can be estimated that the calculation result of the sub microcomputer 12 is normal. This allowable range can be set to a range where the error can be estimated to be within a normal range. Note that the error may be determined to be within the allowable range only when no error has occurred.

If the monitoring apparatus 13 determines in S27 that the calculation error is not within the allowable range, the monitoring apparatus 13 proceeds to S34. On the other hand, if the monitoring apparatus 13 determines in S27 that the calculation error is within the allowable range, the monitoring apparatus 13 proceeds to S28.

In S28, the monitoring apparatus 13 determines whether or not the occupant has performed a stop manipulation. If the monitoring apparatus 13 determines in S28 that the occupant has not performed a stop manipulation, the monitoring apparatus 13 returns to S25. On the other hand, if the monitoring apparatus 13 determines in S28 that the occupant has performed a stop manipulation, the process proceeds to S35.

S29 is executed when an abnormality has occurred in the sub microcomputer 12. The monitoring apparatus 13 continuously checks whether the fallback control by the main microcomputer 11 is normally performed through the processing of S29 to S33.

In S29, the monitoring apparatus 13 determines whether or not the fallback travel is enabled to be executed based on the flag set in S10 and S13, for example. If the monitoring apparatus 13 determines in S29 that the fallback travel is not possible, the monitoring apparatus 13 proceeds to S34. On the other hand, if the monitoring apparatus 13 determines in S29 that the fallback travel is enabled to be performed, the monitoring apparatus 13 proceeds to S30.

In S30, the monitoring apparatus 13 simulates the driving force calculation for the fallback travel. Here, the fallback travel driving force is calculated using the vehicle specifications stored in S12. In S31, the monitoring apparatus 13 receives the driving force calculation result for the fallback travel from the main microcomputer 11.

In S32, the monitoring apparatus 13 determines whether or not an error between the calculation result in S30 and the calculation result received in S31 is within an allowable range. If the error is within the allowable range, it can be estimated that the calculation result of the main microcomputer 11 is normal.

If the monitoring apparatus 13 determines in S32 that the calculation error is not within the allowable range, the monitoring apparatus 13 proceeds to S34. On the other hand, if the monitoring apparatus 13 determines in S32 that the calculation error is within the allowable range, the monitoring apparatus 13 proceeds to S33.

In S33, the monitoring apparatus 13 determines whether the occupant has performed a stop manipulation. If the monitoring apparatus 13 determines in S33 that the occupant has not performed a stop manipulation, the monitoring apparatus 13 returns to S30. On the other hand, if the monitoring apparatus 13 determines in S30 that the occupant has performed a stop manipulation, the process proceeds to S35.

In S34, the monitoring apparatus 13 prohibits the output of the driving force. Here, for example, a flag for permitting the main microcomputer 11 and the sub microcomputer 12 to perform fallback travel is turned off. If an abnormality is detected in either the main microcomputer 11 or the sub microcomputer 12, the normal travel is not enabled to be performed. Further, the fallback travel is prohibited. Thus output of driving force based on each of the normal control and the fallback control is prohibited.

In S35, after the vehicle is stopped, the monitoring apparatus 13 notifies the occupant of the failure by outputting a signal to a control device that controls a display and a speaker (not shown). Here, for example, it is notified that the vehicle is not enabled to travel due to a failure. After S35, the present process is ended.

S5 and S8 correspond to the processing as the specification reception module 41. S9 corresponds to the processing as the determination module 42. S10 and S13 correspond to processing as the setting module 43. S3 and S6 correspond to the processing as the abnormality reception module 44. S11 corresponds to the processing as the notification module 45. S25 and S30 correspond to processing as the third calculation module 46.

1-3. Effects

According to the first embodiment detailed above, the following effects may be provided.

(1a) In the driving force control system 1 of the first embodiment, the monitoring apparatus 13 permits the fallback control only when the received vehicle specifications are appropriate. When the fallback control is executed due to an abnormality occurring in either the main microcomputer 11 or the sub microcomputer 12, the monitoring apparatus 13 can detect the abnormality of the calculation result, thereby improving the safety of the vehicle.

(1b) The monitoring apparatus 13 does not need to store vehicle specifications in advance. Therefore, an electronic control unit with high versatility can be used as the monitoring apparatus instead of an electronic control unit manufactured according to the type of vehicle, Therefore, it is possible to reduce the manufacturing cost of the monitoring apparatus and improve the reliability by sharing parts.

(1c) The determination module 42 determines that the vehicle specifications received by the specification reception module 41 are appropriate when the vehicle specifications received from the main microcomputer 11 matches with that from the sub microcomputer 12. Therefore, the certainty of the vehicle specifications can be determined more accurately.

(1d) The main microcomputer 11 and the sub microcomputer 12 perform mutual monitoring to determine whether an abnormality has occurred in the other microcomputer. The main microcomputer 11 and the sub microcomputer 12 perform normal control if there is no abnormality regardless of the determination result by the determination module 42. Therefore, even if it is a case where the monitoring apparatus 13 cannot monitor the fallback travel, the vehicle is enabled to be activated, so that it is possible to suppress a decrease in convenience for the user.

(1e) If the vehicle specifications received in the past at the time of activation is stored in the memory 13a, the monitoring apparatus 13 does not receive the vehicle specifications again, and determines whether or not the vehicle specifications are appropriate. Therefore, the time until the vehicle is activated can be shortened. In the first embodiment, the vehicle specifications stored in the memory 13a have been determined to be appropriate. Therefore, it can be estimated that the vehicle specifications are appropriate without determining whether the vehicle specifications are appropriate.

2. Second Embodiment

2-1. Main Difference from First Embodiment

Since the basic configuration of a second embodiment is similar to the first embodiment, the main difference will be described below. Note that the same reference signs as those in the first embodiment indicate the same configuration, and refer to the preceding descriptions.

Figure 2:
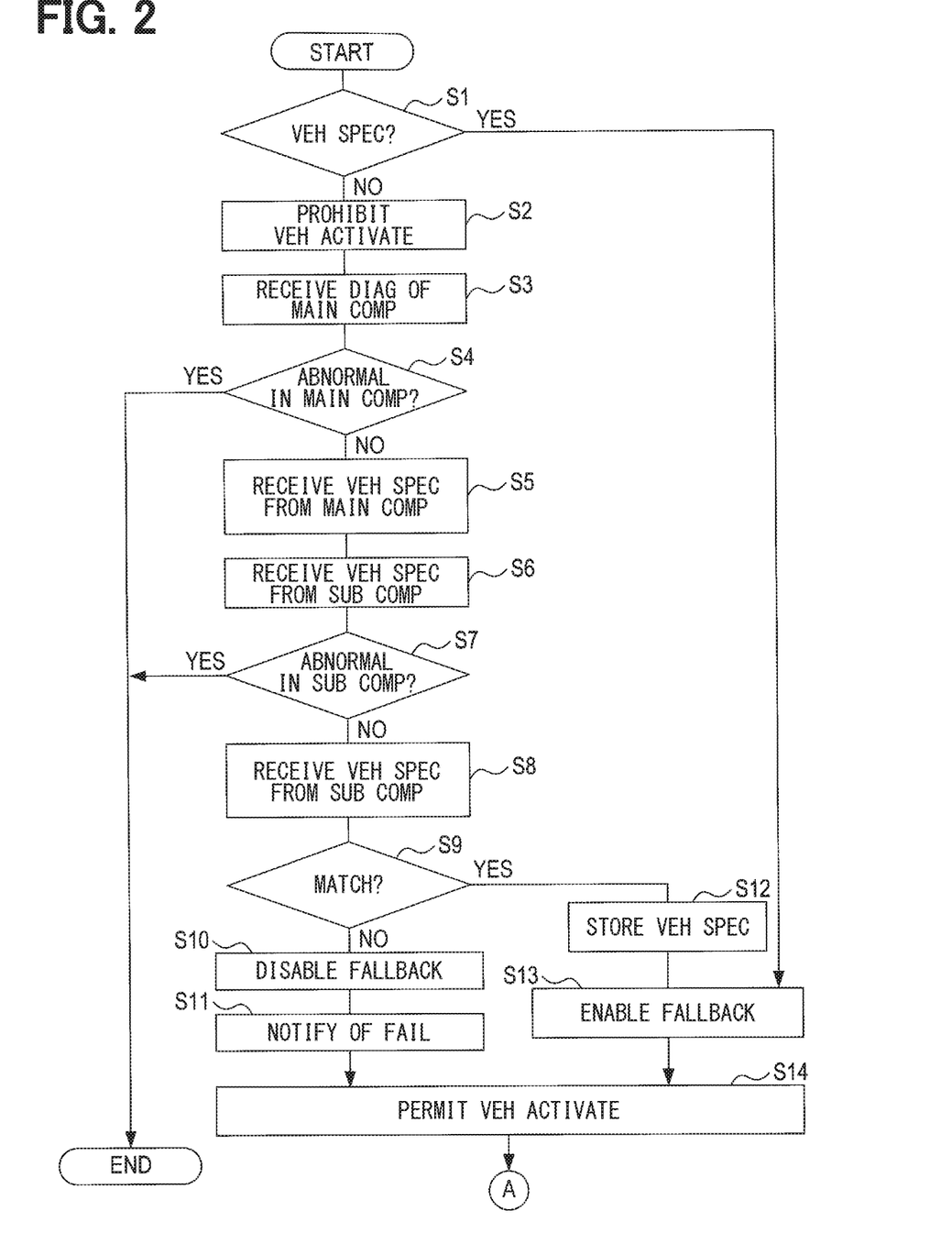
FIG. 2 is a flowchart of a control setting process according to the first embodiment.
Figure 3:
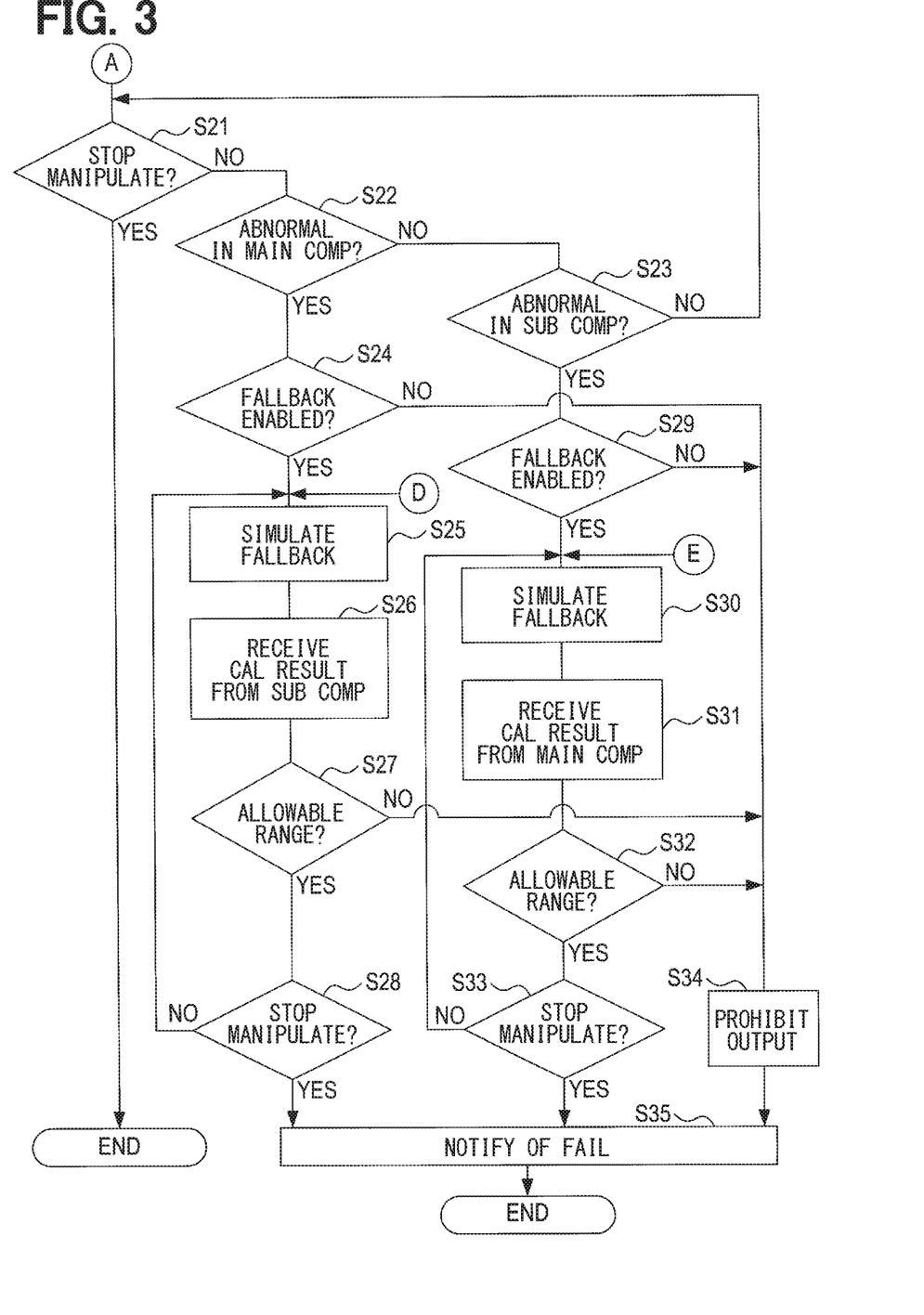
FIG. 3 is a flowchart of a control setting process according to the first embodiment.

In the first embodiment described above, the configuration in which the activation of the vehicle is not permitted when it is determined that there is an abnormality in the main microcomputer 11 or the sub microcomputer 12, respectively, in S4 or S7 of FIG. 2. On the other hand, in the second embodiment, even if there is an abnormality in one microcomputer, the activation of the vehicle is permitted, and the monitoring apparatus 13 obtains the vehicle specifications from the microcomputer without abnormality and performs the simulation calculation of the fallback travel. This is different from the first embodiment.

2-2. Process

The monitoring apparatus 13 executes a control setting process according to the second embodiment, instead of the control setting process according to the first embodiment; the control setting process will be described with reference to the flowcharts of FIGS. 3 to 6, In FIG. 4, the process with the same step number as in FIG. 2 is the same as the process in FIG. 2. Some explanations are simplified. In addition, the process according to FIG. 3 is not substantially changed in processing content as compared with the first embodiment.

Figure 4:
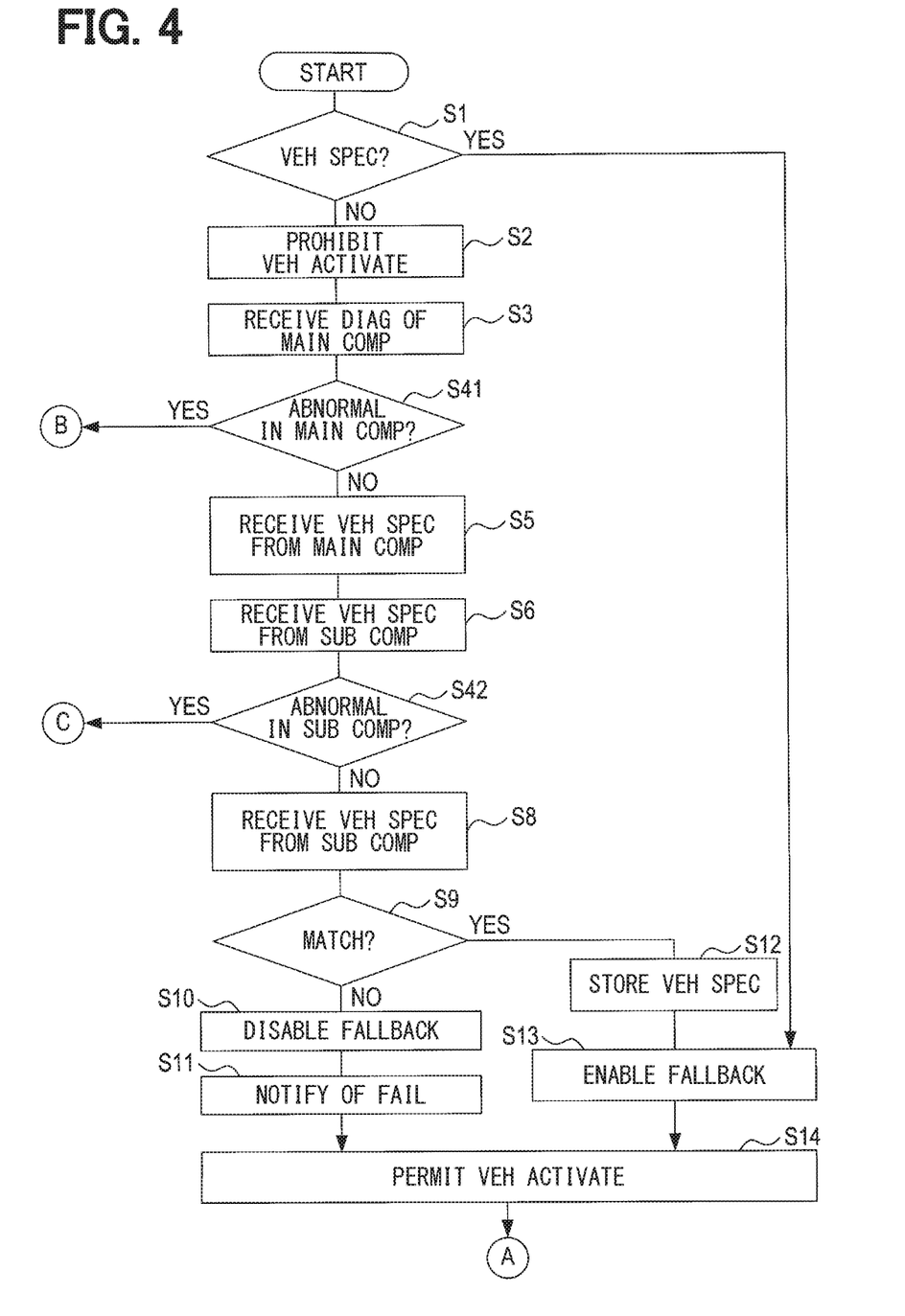
FIG. 4 is a flowchart of a control setting process according to a second embodiment.

In FIG. 4, after the monitoring apparatus 13 receives the abnormality diagnosis result of the main microcomputer 11 in S3, the process proceeds to S41. In S41, the monitoring apparatus 13 determines whether or not an abnormality has occurred in the main microcomputer 11. If the monitoring apparatus 13 determines in S41 that an abnormality has occurred in the main microcomputer 11 in S41, the monitoring apparatus 13 proceeds to S51 in FIG. 5. On the other hand, if the monitoring apparatus 13 determines in S41 that no abnormality has occurred in the main microcomputer 11, the monitoring apparatus 13 proceeds to S5.

Further, after the monitoring apparatus 13 receives the abnormality diagnosis result of the sub microcomputer 12 in S6, the process proceeds to S42. In S42, the monitoring apparatus 13 determines whether or not there is an abnormality in the sub microcomputer 12. If the monitoring apparatus 13 determines in S42 that an abnormality has occurred in the sub microcomputer 12, the monitoring apparatus 13 proceeds to S61 in FIG. 6. On the other hand, if the monitoring apparatus 13 determines in S42 that no abnormality has occurred in the sub microcomputer 12, the monitoring apparatus 13 proceeds to S8.

Figure 5:
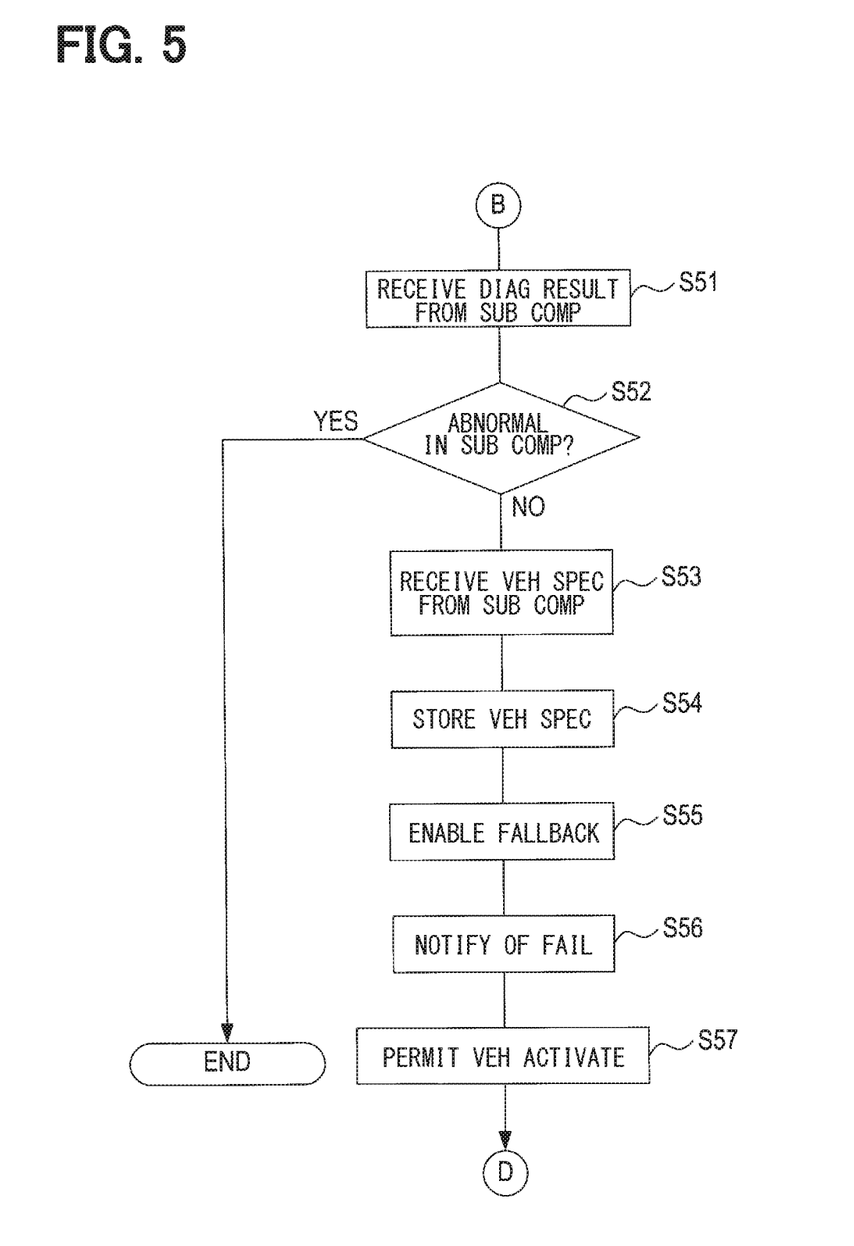
FIG. 5 is a flowchart of a control setting process according to the second embodiment.

Next, a process when it is determined in S41 that an abnormality has occurred in the main microcomputer 11 will be described with reference to FIG. 5. In S51, the monitoring apparatus 13 receives the abnormality diagnosis result of the sub microcomputer 12 from the second diagnosis module 33.

In S52, the monitoring apparatus 13 determines whether or not an abnormality has occurred in the sub microcomputer 12. If the monitoring apparatus 13 determines in S52 that an abnormality has occurred in the sub microcomputer 12, the monitoring apparatus 13 ends this control setting process without permitting the vehicle to be activated.

On the other hand, if the monitoring apparatus 13 determines in S52 that no abnormality has occurred in the sub microcomputer 12, the monitoring apparatus 13 proceeds to S53 and receives vehicle specifications from the sub microcomputer 12. In S54, the monitoring apparatus 13 stores the vehicle specifications received in S53 in the memory 13a of the monitoring apparatus 13.

In S55, the monitoring apparatus 13 enables the fallback travel. Here, for example, a flag for permitting the fallback travel is turned on. In S56, the monitoring apparatus 13 notifies the occupant of the failure by outputting a signal to a control device that controls a display and a speaker (not shown).

In S57, the monitoring apparatus 13 permits vehicle activation. Here, for example, a flag for permitting vehicle activation is turned on and the vehicle is activated. Thereafter, the process proceeds to S25 of FIG. 3.

Figure 6:
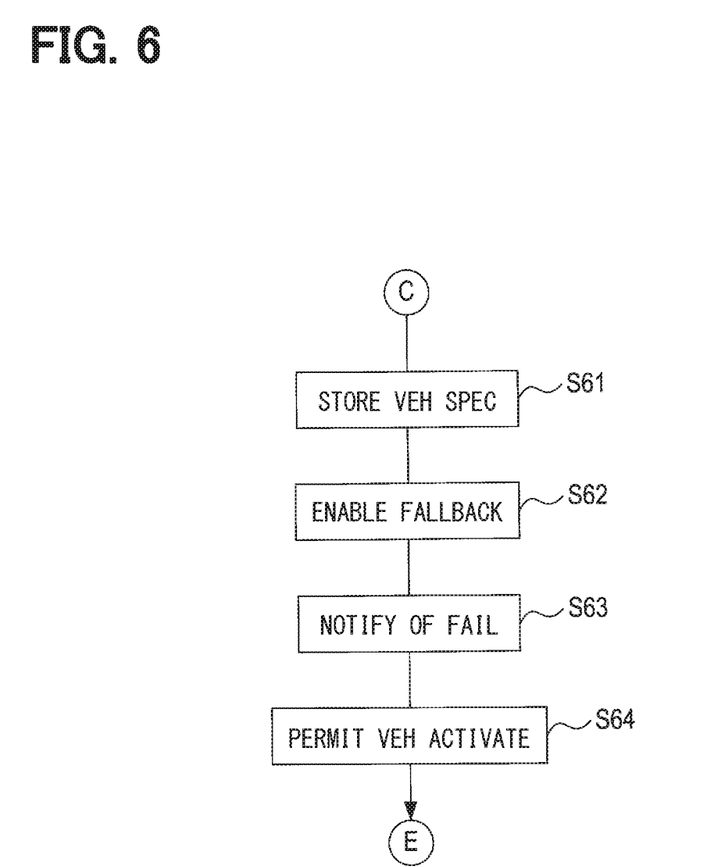
FIG. 6 is a flowchart of a control setting process according to the second embodiment.

Next, a process when it is determined in S46 that an abnormality has occurred in the sub microcomputer 12 will be described with reference to FIG. 6. In S61, the monitoring apparatus 13 stores the vehicle specifications received from the main microcomputer 11 in S5 in the memory 13a of the monitoring apparatus 13.

In S62, the monitoring apparatus 13 enables the fallback traveling. Here, for example, a flag for permitting fallback travel is turned on. In S63, the monitoring apparatus 13 notifies the occupant of the failure by outputting a signal to a control device that controls a display and a speaker (not shown).

In S64, the monitoring apparatus 13 permits the vehicle activation. Here, for example, a flag for permitting vehicle activation is turned on and the vehicle is activated. Thereafter, the process proceeds to S30 of FIG. 3.

2-3. Effects

According to the second embodiment described in detail above, the effects (1a) to (1e) of the first embodiment described above are achieved, and the following effects are further achieved.

(2a) In the driving force control system 1 of the second embodiment, the monitoring apparatus 13 receives the abnormality diagnosis result of the main microcomputer 11 before receiving the vehicle specifications from the main microcomputer 11, and receives the abnormality diagnosis result of the sub microcomputer 12 before receiving the vehicle specifications from the sub microcomputer 12. When the monitoring apparatus 13 determines that one of the microcomputers is abnormal, the monitoring apparatus 13 receives the vehicle specifications from the microcomputer that is not abnormal and monitors the fallback travel. For this reason, even when it is determined that one of the microcomputers is abnormal before the vehicle is activated, the driving force control system 1 is enabled to perform the fallback travel and the convenience for the user is improved.

3. Other Embodiments

While the embodiments of the present disclosure have been described, the present disclosure is not limited to the embodiments described above and can be modified in various manners.

(3a) In the first and second embodiments, the configuration including the two microcomputers of the main microcomputer 11 and the sub microcomputer 12 is illustrated as an example of the electronic control apparatus, but the present disclosure is not limited to this. For example, as shown in the driving force control system 101 shown in FIG. 7, a configuration including the main microcomputer 102 and the monitoring apparatus 103 without including the sub microcomputer may be employed. In this configuration, since the monitoring apparatus 103 cannot compare the vehicle specifications received from the two microcomputers, it determines whether or not the vehicle specifications are appropriate by another method. For example, the monitoring apparatus 103 can employ (i) a determination method using a checksum, (li) a determination method for determining that the vehicle specifications are appropriate when a predetermined password is transmitted from the microcomputer separately from the vehicle specifications and the password matches, or (lii) a determination method for determining whether or not the vehicle specifications are within a predetermined range, and determining that the vehicle specifications are appropriate if the vehicle specifications are within the range.

Figure 7:
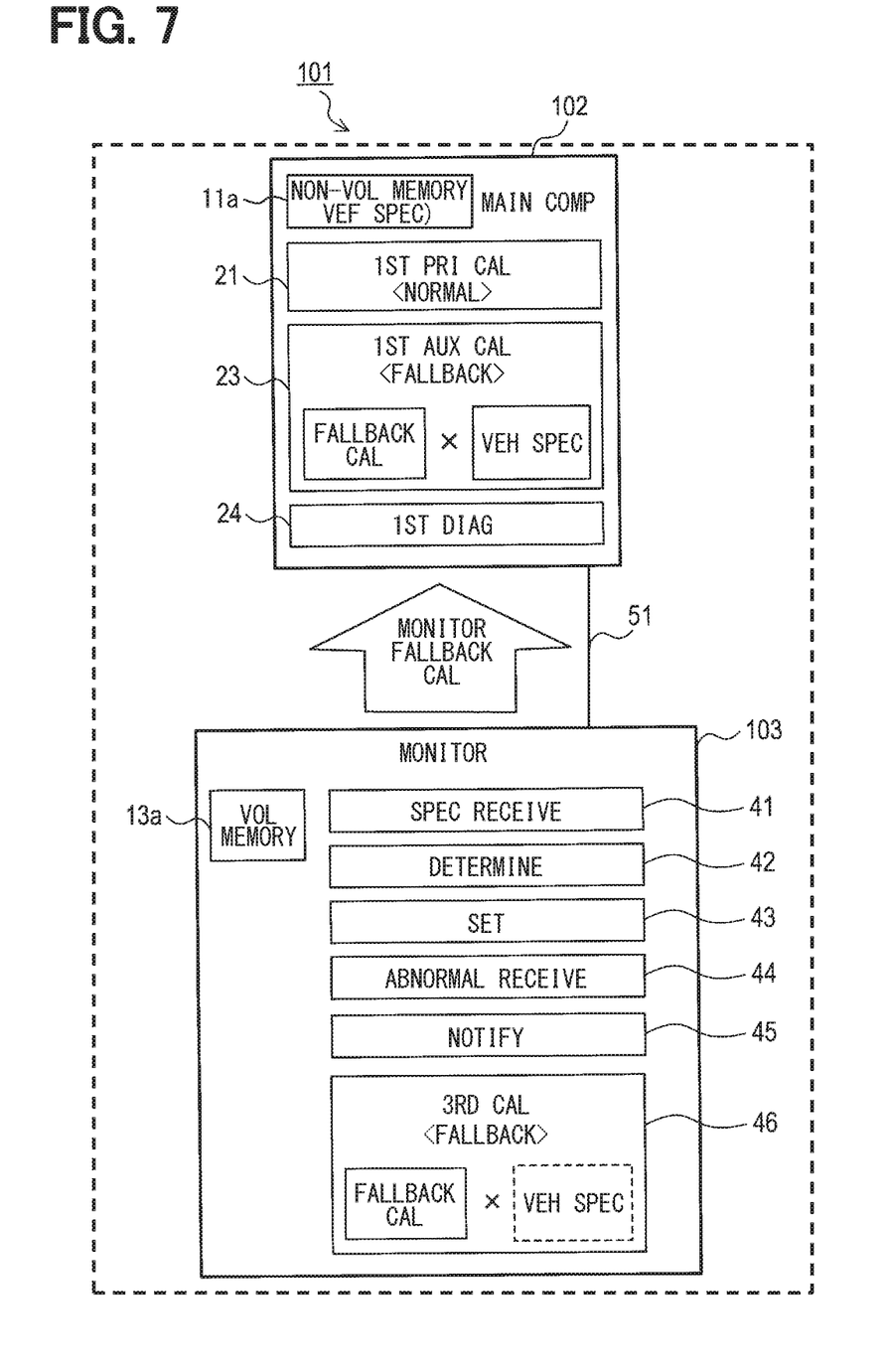
FIG. 7 is a block diagram showing a configuration of a modified example of the driving force control system.

In the driving force control system 101 of FIG. 7, normal control by the main microcomputer 11 is performed until an abnormality is detected by the first diagnosis module 24. After the abnormality is detected, the fallback control by the main microcomputer 11 may be performed. Further; the fallback control may be executed only when the determination module 42 of the monitoring apparatus 13 determines that the vehicle specifications received from the main microcomputer 11 are appropriate.

(3b) In the first and second embodiments, the configuration in which the monitoring apparatus 13 includes the notification module 45 is illustrated, but the notification module may be provided in an electronic control unit other than the monitoring apparatus 13.

(3c) In the first and second embodiments, the configuration in which the main microcomputer 11, the sub microcomputer 12, and the monitoring apparatus 13 are housed in one housing 2 is exemplified. However, the electronic control units may be divided into two or more housings. For example, some electronic control units may be configured as part of other electronic control unit.

(3d) In the first and second embodiments, the main microcomputer 11 and the sub microcomputer 12 have exemplified the configuration capable of executing normal control and fallback control, but other controls and three or more different controls of the driving force may be configured to be executable. Further, the monitoring apparatus 13 may be configured to be able to perform a driving force simulation calculation for a control other than the fallback control and to be compared with a driving force calculation result by a microcomputer.

The monitoring apparatus 13 may be configured to set whether or not the control by the electronic control apparatus is set according to whether or not the vehicle specifications are appropriate for the control other than the fallback control. For example, when it is determined that the vehicle specifications are not appropriate, the monitoring apparatus 13 may be configured not to permit the vehicle to be activated. Specifically, if the vehicle specifications do not match in S9 in FIG. 2, the control setting process may be ended without permitting the vehicle to be activated.

(3e) A monitoring apparatus described above may be provided to include one or more controllers or processors, which may be also provided as one or more special purpose computers. The controllers may be achieved by including a plurality of modules, which may be also referred to as steps, sections, or units, to provide the respective functions. Note that such a module included in the controller or the controller itself may be configured by (i) a central processing unit (CPU) along with memory storing instructions (i.e., computer program) executed by the CPU, or (ii) hardware circuitry such as an integrated circuit or hard-wired logic circuit with no CPU, or (iii) both the CPU along with memory and the hardware circuitry. The computer programs or instructions may be stored in a non-transitory tangible computer-readable storage medium to be executed by the CPU.

(3f) Multiple functions of one element in the described above embodiment may be implemented by multiple elements, or one function of one element may be implemented by multiple elements. Further, multiple functions of multiple elements may be implemented by one element, or one function implemented by multiple elements may be implemented by one element. A part of the configuration of the above embodiments may be omitted. At least a part of the configuration of the above embodiments may be added to or replaced with another configuration of the above embodiments.

(3g) The present disclosure may be realized in a plurality of forms, in addition to the monitoring apparatus described above; the other forms may include a system including the monitoring apparatus as an element, a program for causing a computer to function as the monitoring apparatus, a non-transitory tangible storage medium such as a semiconductor memory storing the program, and a monitoring method.

For reference to further explain features of the present disclosure, the description is added as follows.

A system is known in which a plurality of electronic control units communicate with each other. For example, a technique is proposed which transmits and receives data necessary for execution of processing by the electronic control units during operation of the system.

There is a driving force monitoring system that includes a plurality of electronic control units to control the driving force of a vehicle. In such a driving force monitoring system, if the data transmitted and received is inappropriate, a safety of an occupant of the vehicle may not be secured sufficiently.

It is thus desired to provide a technique capable of proving the safety of a vehicle.

Aspects of the present disclosure described herein are set forth in the following clauses.

According to a first aspect of the present disclosure, a monitoring apparatus used in a vehicle is provided to communicate with an electronic control apparatus that controls a driving force of the vehicle by executing any one of a plurality of predetermined different controls. The monitoring apparatus includes a specification reception module, a determination module, and a setting module. The specification reception module is configured to receive a vehicle specification from the electronic control apparatus. The determination module is configured to determine whether the vehicle specification received by the specification reception module is appropriate. The setting module is configured to set whether at least one of the predetermined different controls is permitted or not permitted to be executed by the electronic control apparatus in response to a determination result by the determination module.

In the above, the specification reception module, the determination module, and the setting module may be provided to be included in one or more controllers communicating with the electronic control apparatus.

According to such a configuration, the monitoring apparatus can cause the electronic control apparatus to execute different driving force controls depending on whether or not the received vehicle specification is appropriate. Therefore, for example, when the vehicle specification received by the monitoring apparatus is not appropriate, only the driving force control with high safety can be permitted to be executed by the electronic control apparatus. The safety of the vehicle can be thus improved.

According to another aspect of the present disclosure, a driving force control system mounted to a vehicle is provided to include an electronic control apparatus configured to control a driving force of the vehicle by executing any one of a plurality of predetermined different controls and a monitoring apparatus configured to communicate with the electronic control apparatus. The monitoring apparatus includes a specification reception module, a determination module, and a setting module. The specification reception module is configured to receive a vehicle specification from the electronic control apparatus. The determination module is configured to determine whether the vehicle specification received by the specification reception module is appropriate. The setting module is configured to set whether at least one of the predetermined different controls is permitted or not permitted to be executed by the electronic control apparatus in response to a determination result by the determination module. In the above, the specification reception module, the determination module, and the setting module may be provide to be included in one or more controllers communicating with the electronic control apparatus.

According to such a configuration, the monitoring apparatus can cause the electronic control apparatus to execute different driving force controls depending on whether or not the received vehicle specification is appropriate. Therefore, for example, when the vehicle specification received by the monitoring apparatus is not appropriate, only the driving force control with high safety can be permitted to be executed by the electronic control apparatus. The safety of the vehicle can be thus improved.

What is claimed is:

1. A monitoring apparatus used in a vehicle to communicate with an electronic control apparatus that controls a driving force of the vehicle by executing any one of a plurality of predetermined different controls, the monitoring apparatus comprising:
    a specification reception module configured to receive a vehicle specification from the electronic control apparatus;
    a determination module configured to determine whether the vehicle specification received by the specification reception module is appropriate; and
    a setting module configured to set whether at least one of the predetermined different controls is permitted or not permitted to be executed by the electronic control apparatus in response to a determination result by the determination module.

2. The monitoring apparatus according to claim 1, wherein:
    the electronic control apparatus includes a first electronic control unit and a second electronic control unit;
    the specification reception module is configured to receive the vehicle specification from the first electronic control unit and the second electronic control unit; and
    the determination module is configured to determine that the vehicle specification received by the specification reception module is appropriate in response to that the vehicle specification received from the first electronic control unit match the vehicle specification received from the second electronic control unit.

3. The monitoring apparatus according to claim 2, wherein:
    each of the first electronic control unit and the second electronic control unit is configured to be capable of executing each of (i) a normal control and (ii) a fallback control whose function is limited as compared to the normal control, as the plurality of predetermined different controls;
    a one of the first electronic control unit and the second electronic control unit monitors whether or not an abnormality occurs in a different one of the first electronic control unit and the second electronic control unit;
    in response to that no abnormality occurs in any of the first electronic control unit and the second electronic control unit, the normal control is executed;
    in response to that an abnormality occurs in either the first electronic control unit or the second electronic control unit, the fallback control is executed; and
    the setting module is configured to set the fallback control as being not permitted to be executed in response to that the determination module determines that the vehicle specification received by the specification reception module is not appropriate.

4. The monitoring apparatus according to claim 3, further comprising:
    a notification module configured to perform an output to notify an occupant of the vehicle of an abnormality, wherein
    the notification module is configured to perform the output in response to that the determination module determines that the vehicle specification received by the specification reception module is not appropriate.

5. The monitoring apparatus according to claim 2, wherein:
    each of the first electronic control unit and the second electronic control unit is configured to be capable of executing (i) a normal control and (ii) a fallback control whose function is limited as compared to the normal control, as the predetermined different controls;

the first electronic control unit is configured to be able to execute an abnormality diagnosis of the first electronic control unit, and the second electronic control unit is configured to be able to execute an abnormality diagnosis of the second electronic control unit;

the monitoring apparatus further comprises an abnormality reception module configured to receive a result of the abnormality diagnosis from the first electronic control unit and the second electronic control unit; and in response to that the abnormality reception module receives a result of the abnormality diagnosis indicating that an abnormality occurs in a one of the first electronic control unit and the second electronic control unit, the setting module is configured to set the fallback control as being permitted to be executed by a different one of the first electronic control unit and the second electronic control unit.

6. The monitoring apparatus according to claim 1, wherein:

the setting module is configured to prevent the specification reception module from receiving the vehicle specification in response to that the vehicle specification of the electronic control apparatus is stored in the monitoring apparatus when the monitoring apparatus is activated.

7. The monitoring apparatus according to claim 1, further comprising:

a calculation module configured to calculate the driving force of the vehicle to provide a calculation result by using a predetermined calculation based on the vehicle specification received by the specification reception module, wherein in response to that an error between (i) the calculation result provided by the calculation module and (ii) a calculation result by the electronic control apparatus by using the predetermined calculation is within a predetermined range, the setting module is configured to set a specified control using the predetermined calculation, from the predetermined different controls, as being permitted to be executed by the electronic control apparatus.

8. A driving force control system mounted to a vehicle, comprising:

an electronic control apparatus configured to control a driving force of the vehicle by executing any one of a plurality of predetermined different controls; and a monitoring apparatus connected with the electronic control apparatus via a communication link, the monitoring apparatus being configured to communicate with the electronic control apparatus, the monitoring apparatus comprising:

a controller configured to receive a vehicle specification from the electronic control apparatus, determine whether the received vehicle specification is appropriate to provide a determination result, and set whether at least one of the predetermined different controls is permitted or not permitted to be executed by the electronic control apparatus in response to the determination result, wherein:

the electronic control apparatus includes a first electronic control unit and a second electronic control unit; and the controller is configured to receive the vehicle specification from each of the first electronic control unit and the second electronic control unit, and determine that the received vehicle specification is appropriate in response to the vehicle specification received from the first electronic control unit matching the vehicle specification received from the second electronic control unit.

9. The driving force control system according to claim 8, wherein:

each of the first electronic control unit and the second electronic control unit is configured to be capable of executing each of (i) a normal control and (ii) a fallback control whose function is limited as compared to the normal control, as the plurality of predetermined different controls;

a one of the first electronic control unit and the second electronic control unit monitors whether or not an abnormality occurs in a remaining one of the first electronic control unit and the second electronic control unit excluding the one of the first electronic control unit and the second electronic control unit;

in response to no abnormality occurring in any of the first electronic control unit and the second electronic control unit, the normal control is executed;

in response to an abnormality occurring in either the first electronic control unit or the second electronic control unit, the fallback control is executed; and the controller in the monitoring apparatus is further configured to set the fallback control as being not permitted to be executed in response to determining that the received vehicle specification is not appropriate.

10. The driving force control system according to claim 9, wherein:

the controller in the monitoring apparatus is further configured to perform an output to notify an occupant of the vehicle of an abnormality in response to determining that the received vehicle specification is not appropriate.

11. The driving force control system according to claim 8, wherein:

each of the first electronic control unit and the second electronic control unit is configured to be capable of executing (i) a normal control and (ii) a fallback control whose function is limited as compared to the normal control, as the predetermined different controls;

the first electronic control unit is configured to be able to execute an abnormality diagnosis of the first electronic control unit, and the second electronic control unit is configured to be able to execute an abnormality diagnosis of the second electronic control unit;

the controller in the monitoring apparatus is further configured to receive a result of the abnormality diagnosis from the first electronic control unit and the second electronic control unit, and set the fallback control as being permitted to be executed by a one of the first electronic control unit and the second electronic control unit in response to receiving a result of the abnormality diagnosis indicating that an abnormality occurs in a remaining one of the first electronic control unit and the second electronic control unit.

12. The driving force control system according to claim 8, wherein:

the controller in the monitoring apparatus is further configured to prevent reception of the vehicle specification in response to the vehicle specification of the electronic control apparatus being stored in the monitoring apparatus when the monitoring apparatus is activated.

13. The driving force control system according to claim 8, wherein:
the controller in the monitoring apparatus is further configured to
calculate the driving force of the vehicle to provide a calculation result by using a predetermined calculation based on the received vehicle specification, and
set a specified control using the predetermined calculation, from the predetermined different controls, as being permitted to be executed by the electronic control apparatus in response to an error being within a predetermined range, the error being between (i) the calculation result and (ii) a calculation result by the electronic control apparatus by using the predetermined calculation.

14. A monitoring apparatus used in a vehicle, comprising:
a controller connected via a communication link with an electronic control apparatus that controls a driving force of the vehicle by executing any one of a plurality of predetermined different controls, the controller being configured to:
receive a vehicle specification from the electronic control apparatus;
determine whether the received vehicle specification is appropriate to provide a determination result; and
set whether at least one of the predetermined different controls is permitted or not permitted to be executed by the electronic control apparatus in response to the determination result, wherein
the controller is further configured to
receive the vehicle specification from each of a first electronic control unit and a second electronic control unit, which are included in the electronic control apparatus, and
determine that the received vehicle specification is appropriate in response to the vehicle specification received from the first electronic control unit matching the vehicle specification received from the second electronic control unit.

15. The monitoring apparatus according to claim 14, wherein:
each of the first electronic control unit and the second electronic control unit is configured to be capable of executing each of (i) a normal control and (ii) a fallback control whose function is limited as compared to the normal control, as the plurality of predetermined different controls;
a one of the first electronic control unit and the second electronic control unit monitors whether or not an abnormality occurs in a remaining one of the first electronic control unit and the second electronic control unit excluding the one of the first electronic control unit and the second electronic control unit;
in response to no abnormality occurring in any of the first electronic control unit and the second electronic control unit, the normal control is executed;
in response to an abnormality occurring in either the first electronic control unit or the second electronic control unit, the fallback control is executed; and
the controller is further configured to set the fallback control as being not permitted to be executed in response to determining that the received vehicle specification is not appropriate.

16. The monitoring apparatus according to claim 15, wherein
the controller is further configured to perform an output to notify an occupant of the vehicle of an abnormality in response to determining that the received vehicle specification is not appropriate.

17. The monitoring apparatus according to claim 14, wherein:
each of the first electronic control unit and the second electronic control unit is configured to be capable of executing (i) a normal control and (ii) a fallback control whose function is limited as compared to the normal control, as the predetermined different controls;
the first electronic control unit is configured to be able to execute an abnormality diagnosis of the first electronic control unit, and the second electronic control unit is configured to be able to execute an abnormality diagnosis of the second electronic control unit;
the controller is further configured to
receive a result of the abnormality diagnosis from each of the first electronic control unit and the second electronic control unit, and
set the fallback control as being permitted to be executed by a one of the first electronic control unit and the second electronic control unit in response to receiving a result of the abnormality diagnosis indicating that an abnormality occurs in a remaining one of the first electronic control unit and the second electronic control unit excluding the one of the first electronic control unit and the second electronic control unit.

18. The monitoring apparatus according to claim 14, wherein:
the controller is further configured to prevent reception of the vehicle specification in response to the vehicle specification of the electronic control apparatus being stored in the monitoring apparatus when the monitoring apparatus is activated.

19. The monitoring apparatus according to claim 14, wherein:
the controller is further configured to
calculate the driving force of the vehicle to provide a calculation result by using a predetermined calculation based on the received vehicle specification, and
set a specified control using the predetermined calculation, from the predetermined different controls, as being permitted to be executed by the electronic control apparatus in response to an error being within a predetermined range, the error being between (i) the calculation result and (ii) a calculation result by the electronic control apparatus by using the predetermined calculation.

* * * * *